(12) United States Patent
Iwamasa et al.

(10) Patent No.: US 7,090,054 B2
(45) Date of Patent: Aug. 15, 2006

(54) OIL CONTAINER AND DISPENSER

(75) Inventors: Jonathan M. Iwamasa, Columbia Station, OH (US); Steven K. Morris, Avon, OH (US)

(73) Assignee: Emerson Electric Co., St. Louis, MO (US)

( * ) Notice: Subject to any disclaimer, the term of this patent is extended or adjusted under 35 U.S.C. 154(b) by 476 days.

(21) Appl. No.: 10/601,113

(22) Filed: Jun. 23, 2003

(65) Prior Publication Data

US 2005/0006384 A1  Jan. 13, 2005

(51) Int. Cl.
*F16N 31/00* (2006.01)
(52) U.S. Cl. ..................................... 184/106
(58) Field of Classification Search ............... 184/106
See application file for complete search history.

(56) References Cited

U.S. PATENT DOCUMENTS

| | | | |
|---|---|---|---|
| 1,866,106 A * | 7/1932 | Herlihy .................. | 222/628 |
| 1,937,032 A | 11/1933 | Schlosshauer | |
| 2,810,496 A | 10/1957 | Gray | |
| 2,865,540 A | 12/1958 | Gray | |
| 4,109,869 A | 8/1978 | Brockelsby et al. | |
| 4,673,081 A * | 6/1987 | Habig et al. ............. | 206/223 |
| 5,002,203 A | 3/1991 | Einer | |
| 5,067,591 A | 11/1991 | Fehlig | |
| D498,487 S * | 11/2004 | Iwamasa et al. ......... | D15/152 |
| 2002/0124694 A1 * | 9/2002 | Vandiver .................. | 82/52 |

OTHER PUBLICATIONS

The Ridge Tool Company catalog entitled "RIDGID Full Line Catalog," 2002, pp. 30 and 34.
The Ridge Tool Company catalog entitled "RIDGID," 1999, pp. 32 and 37.

* cited by examiner

Primary Examiner—David Fenstermacher
(74) Attorney, Agent, or Firm—Fay, Sharpe, Fagan, Minnich & McKee, LLP

(57) ABSTRACT

A container for a manually operable oil dispenser for use with metal working machines comprises a bucket providing a reservoir for oil to be dispensed and a pan in the bucket for catching oil and chips dropping thereinto and for returning the oil to the bucket. The bucket has a bottom, a sidewall and an annular upper end, and the pan has an apertured bottom spaced above the bottom of the bucket, a sidewall inwardly of the sidewall of the bucket and an upper end overlying and slidable circumferentially relative to the upper end of the bucket. The bucket and pan have locking members interengaging during relative sliding displacement therebetween to releasably interengage the bucket and pan against separation. The bottom and sidewall of the bucket are contoured to minimize the volume of oil necessary in the reservoir area for continual operation of the dispenser, and the bucket is provided with a bulkhead fitting for attachment to a dispensing pump hose at an angle of 45° to horizontal.

62 Claims, 13 Drawing Sheets

OIL CONTAINER AND DISPENSER

BACKGROUND OF THE INVENTION

This invention relates to the art of containers for fluid dispensers and, more particularly, to a container for oil to be dispensed onto a workpiece in metal working machinery such as pipe threaders.

Portable oil dispensers have been provided heretofore for use with pipe threading apparatus, for example. One such oil dispenser has been available from the Ridge Tool Company of Elyria, Ohio under the latter's product designation No. 418 Oiler, comprising a bucket providing a reservoir for thread cutting oil, a drip pan removably mounted on the bucket for receiving chips and oil from the thread cutting apparatus and separating the oil for return to the reservoir area in the bucket, and a handheld trigger operated pump connected to the bucket by a flexible hose and operable by a threading machine operator to dispense oil onto a workpiece being threaded. The initial version of the 418 Oiler, and others currently on the market which are similar thereto, include a round, flat bottom metal bucket and a metal drip pan removably mounted on the rim of the bucket by a plurality of over-center latches having bases spot welded on the bucket. Further, the latter is provided with a bail having its opposite ends pivotally associated with bail mounting supports which are welded to the bucket. The drip pan in the earlier version of the 418 Oiler includes a pair of handles welded thereon for lifting the pan from the bucket, and the bulkhead fitting for connecting the hose to the bucket is mounted on the arcuate sidewall of the bucket and has a discharge opening extending vertically and to which the pump hose is attached. In a later version of the 418 Oiler, the metal drip pan is replaced by a plastic pan which is removably mounted on the bucket through the use of the existing latches and which has integral handles for lifting the pan from the bucket.

While oilers of the foregoing character serve their intended purpose, there are a number of disadvantages attendant to the structure and use thereof. In this respect, for example, the number of parts and the necessary assembly operations with respect thereto make the cost and the weight thereof undesirably high. Moreover, during use, the pump hose is often used to pull the bucket and pan assembly from one location to another along the underlying floor or other support surface, and the frictional engagement between the surface and the flat bottom of the bucket makes the sliding movement difficult. Further in this respect, the flat bottom bucket contour requires maintaining an excessive quantity of oil in the bucket for continuous operation of the oiler, and the weight of the oil adds to the difficulty with respect to sliding the oiler across the underlying surface. Still further, the vertical disposition of the hose at the outlet of the bulkhead fitting results in the imposition of side forces and bending of the hose at the fitting when the hose is used to pull the oiler. Ultimately, this causes fracture of the hose requiring replacement thereof. Moreover, using a plastic drip pan with the latch arrangement used for metal pans results in deterioration of the plastic and thus the latched interengagement of the pan with the bucket, whereby the pan becomes loose. This looseness promotes instability with respect to pan retention should the oiler be dropped during transportation, or turned over during use, and promotes a decrease in the seal between the bucket and pan which can result in leakage of oil during use, transportation or storage of the oiler.

SUMMARY OF THE INVENTION

In accordance with the present invention, an oiler is provided by which the foregoing and other problems and disadvantages of oilers heretofore available are minimized or overcome. Further in this respect, and in accordance with one aspect of the invention, an oiler bucket structure is provided by which frictional interengagement between the bucket and an underlying surface is reduced relative to that encountered with a flat bottom bucket. This advantageously reduces the force and physical effort required to pull the oiler along an underlying surface. In accordance with another aspect of the invention, an oiler bucket is contoured to reduce the minimum amount of oil required in the bucket for continual operation relative to the amount of oil required in connection with the use of oilers heretofore available. This further enhances pulling of the oiler by reducing the weight thereof, and the latter makes it easier to lift and carry the oiler. In accordance with yet another aspect of the invention, the hose bulkhead fitting and bucket of an oiler are structured and structurally interrelated so as to minimize or eliminate side forces and bending of the hose at the fitting in response to an operator pulling on the hose to move the oiler across an underlying surface, thus improving the hose life. In accordance with still another aspect of the invention, an oiler bucket and drip pan are structured and interrelated so as to be separably interengaged with one another, without the use of separate latches attached to the bucket and, in accordance with a further aspect of the invention, the bucket and pan are provided with a sealing arrangement to optimize sealing interengagement therebetween. These features promote stability against separation thereof and/or leakage therebetween should, for example, the oiler be dropped during use or transportation thereof. Preferably, the bucket and drip pan components are produced from plastic material, such as a suitable low density polyethylene. The latter promotes a reduction in weight as well as a minimizing of the number of component parts and, accordingly, a reduction in assembly time and cost of the oiler. Moreover, and in accordance with yet a further aspect of the invention, a plastic bail support receives a metal bail plate which provides a unique mounting arrangement in connection with a bail by which the container can be lifted and carried.

It is accordingly an outstanding object of the present invention to provide an improved container for a portable oiler of the character used for dispensing oil onto a workpiece during the performance of a metal working operation thereon.

Another object is the provision of a container of the foregoing character which requires less oil than heretofore required to maintain a minimum quantity of oil in the container for continuous operation of the oiler.

Yet another object is the provision of a container of the foregoing character which is easier to pull along an underlying surface from one location to another.

Still another object is the provision of a container of the foregoing character in which the connection of the dispensing hose to the bucket of the container enables pulling of the container along an underlying surface through use of the hose with minimum imposition of side forces on the hose in the area of connection thereof with the container, thus to deter bending and deterioration of the hose at the point of connection.

Another object is the provision of a container of the foregoing character having an improved bail mounting arrangement.

A further object is the provision of a container of the foregoing character in which the bucket and drip pan are releasably interengaged without the use of manually operated mechanical latch components and in a manner which promotes retention of the pan on the bucket in the event of the assembly being dropped during use of the dispenser.

Still a further object is the provision of a container of the foregoing character which, when containing the minimum quantity of oil necessary for continuous operation, is lighter in weight and thus easier to pull along an underlying surface and/or to lift and carry than containers heretofore available having a flat bottom bucket containing the necessary quantity of oil for continuous use.

Yet a further object is the provision of a container of the foregoing character in which sealing between the bucket and pan is optimized to minimize or avoid the leakage of oil therebetween during use and/or storage.

Another object is the provision of a container of the foregoing character comprising a minimum number of component parts structured and structurally interrelated to promote ease of handling during use and storage while providing structural integrity against damage during use and storage.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
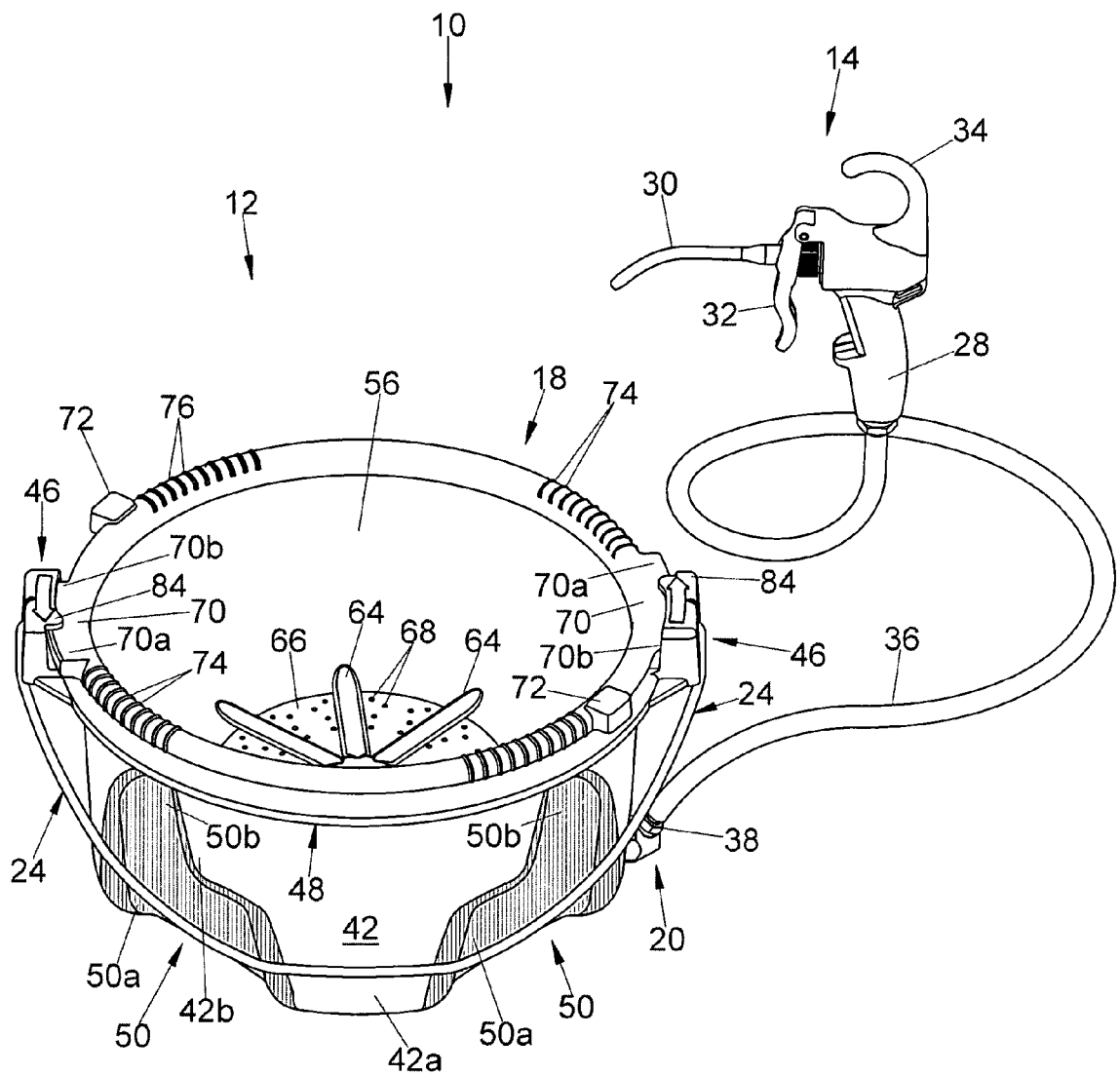
FIG. 1 is a perspective view of an oiler including an oil container in accordance with the invention.

Referring now in greater detail to the drawings, wherein the showings are for the purpose of illustrating a preferred embodiment of the invention only, and not for the purpose of limiting the invention, a portable oiler 10 is illustrated in FIG. 1 which comprises a container 12 in accordance with the present invention and a manually operable pump 14 for dispensing oil in the container onto a workpiece supported in a metal working machine such as a pipe or rod threader. In use, as is well known, container 12 is positioned beneath the working area of the machine so as to receive oil and metal chips which drop from the working area.

Figure 2:
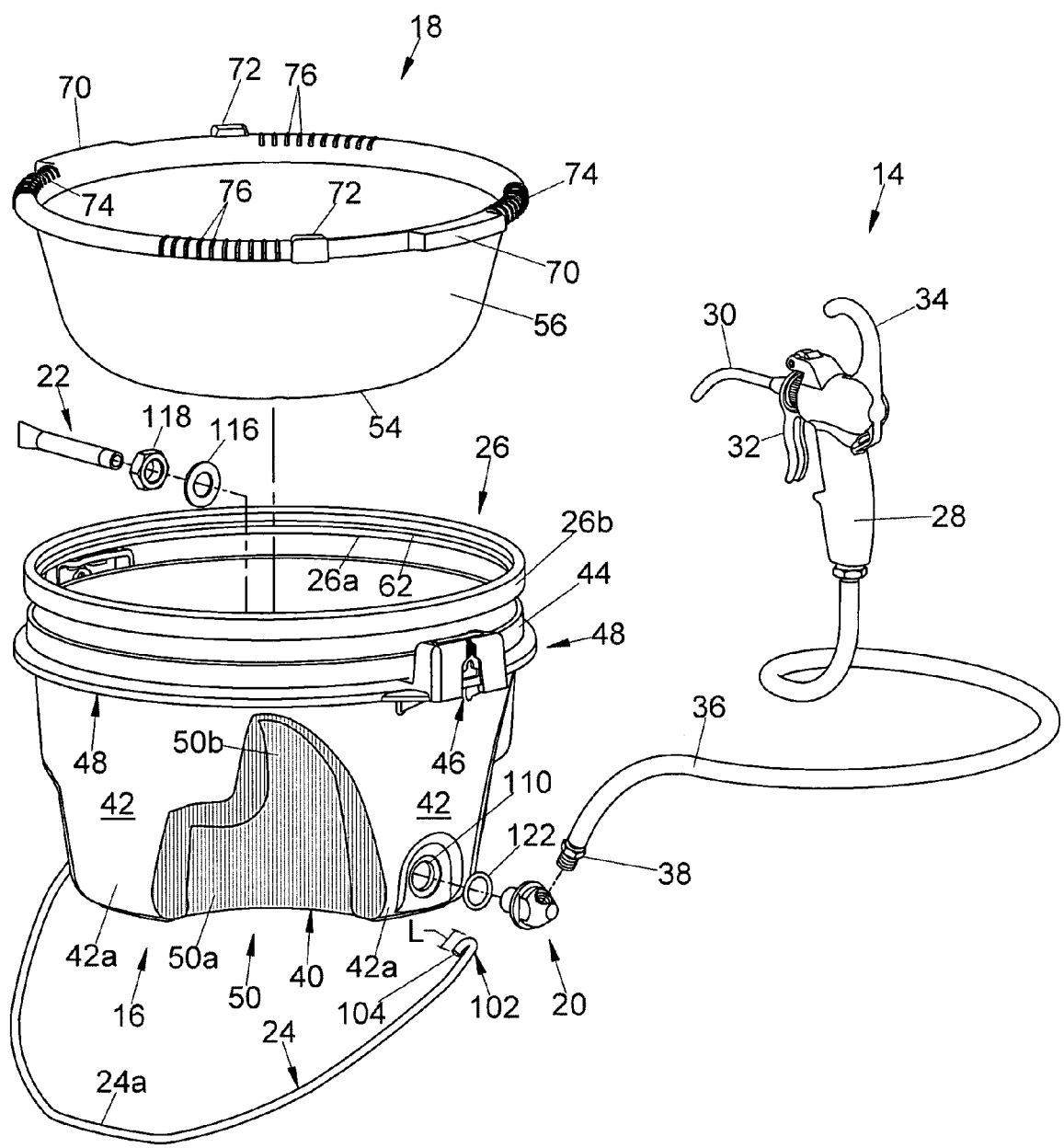
FIG. 2 is an exploded perspective view of the oiler shown in FIG. 1.
Figure 3:
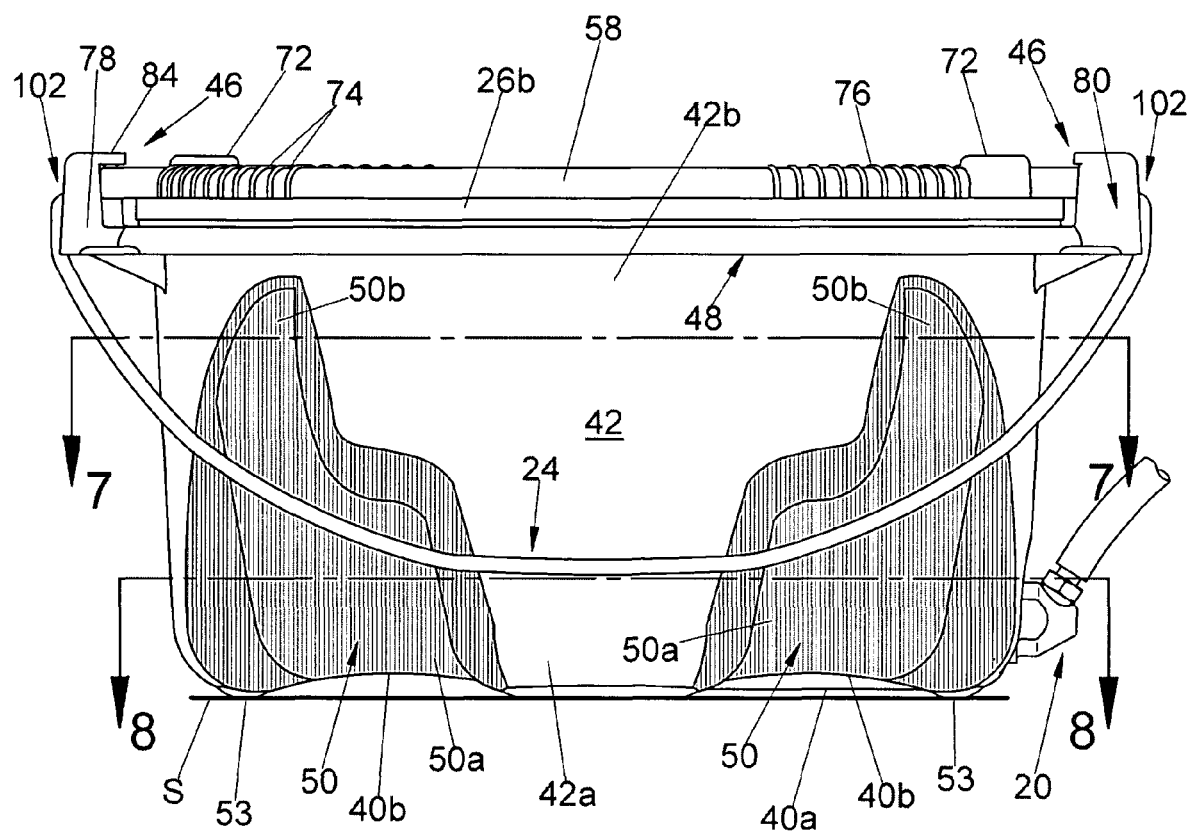
FIG. 3 is a side elevation view of the oil container.

As best seen in FIG. 2, the primary component parts of a container in accordance with the invention are a bucket 16 which, as will become apparent hereinafter, provides a reservoir for oil to be pumped from the container to the working area, and a drip pan or tray 18 for receiving metal chips and oil dripping from the working area and retaining the chips while allowing the oil to return to the reservoir area of the bucket. Bucket 16 includes a bulkhead fitting 20 for connecting the reservoir area of the bucket in flow communication with pump 14 and, preferably, a strainer 22 for straining oil during pumping thereof from the reservoir area. The container also preferably includes a bail 24 for lifting and carrying the container, and a sealing ring 26 interposed between the bucket and drip pan for optimizing sealing interengagement therebetween. Pump 14 is well known and, as will be appreciated from FIGS. 1 and 2, comprises a handle 28 by which the pump is held and manipulated by a user, a dispensing nozzle or tube 30, and a trigger 32 which is manually operable to pump oil from the reservoir area of bucket 16 through nozzle 30 and onto a workpiece. The pump further includes a hook 34 by which the pump can be supported adjacent the work area. A flexible hose 36 is attached to a threaded coupling element 38 by which the hose is mounted on bulkhead fitting 20, and hose 36 delivers oil to pump 14 in response to actuation of trigger 32.

Bucket 16, as best seen in FIGS. 3, 4 and 6–8, comprises a bottom wall 40 and a sidewall 42 extending thereabout and upwardly therefrom and terminating in an upwardly extending peripheral rim 44. Diametrically opposite sides of the bucket in the rim area thereof are each provided with a bail plate mounting and pan interengaging component 46 which is described in greater detail hereinafter, and outwardly and downwardly extending reinforcing flanges 48 extend circumferentially between adjacent sides of the components 46 at a location adjacent the lower edge of rim 44. Bucket 16 is produced from a suitable plastic material, preferably a low density polyethylene, and sidewall 42 is provided with diametrically opposed pairs of inwardly extending recesses 50. Recesses 50 are somewhat porkchop-shaped and serve to rigidify the sidewall while providing aesthetic value and, as explained more fully hereinafter, the recesses cooperate with bottom wall 40 to reduce the quantity of oil required in the reservoir area R of the bucket for continual operation of the oiler in comparison with the quantity required for a bucket of the same diameter having a flat bottom and circular sidewall profile. Partly, in this respect, each of the recesses 50 has a lower portion 50a which is circumferentially wider than upper portion 50b thereof, and the lower portions 42a of sidewall 42 between adjacent recesses 50 are circumferentially narrower than recess portions 50a while upper portions 42b are circumferentially wider than recess portions 50b. Further, bottom wall 40 has a circumferentially narrow recess or depression 52 therein defined by a flat, somewhat oval-shaped portion 40a of the bottom wall, and a portion 40b extending circumferentially about recess 52 and arcuately upwardly therefrom. Recess 52 accommodates strainer 22 which is mounted on the bucket as set forth more fully hereinafter. The geometry of the bucket as defined by the contour of bottom wall 40, the contour of sidewall 42 and peripheral flanges 48 adjacent the upper end of the bucket provides physical strength and rigidity against distortion or breakage during use and transportation of the container, or dropping of the container. Importantly, the contour of bottom wall 40 and lower portions 50a of recesses 50 in the sidewall adjacent thereto reduce the volume in reservoir area R of the bucket relative to that of a bucket of corresponding size having a flat bottom and circular sidewall, thus enabling operation of the oiler with less oil in the bucket than would be required with a bucket of the same size having a flat bottom and circular side.

Referring again to FIGS. 3, 4 and 6–8, the radially outer periphery of bottom wall 40 of bucket 16 is recessed upwardly relative to sidewall 42 for the radially outer portions of the bottom wall and the adjacent lower ends 42a of the sidewall to cooperatively provide diametrically opposite pairs of distinct, downwardly facing feet 53 for engaging an underlying surface S upon which the container is resting. As will be appreciated from FIG. 7, for example, the area of feet 53 is considerably less than the area of the remainder of the bottom wall, whereby the feet minimize frictional interengagement between the bucket and an underlying surface S, thus making it easier to pull the container along the underlying surface.

Figure 9:
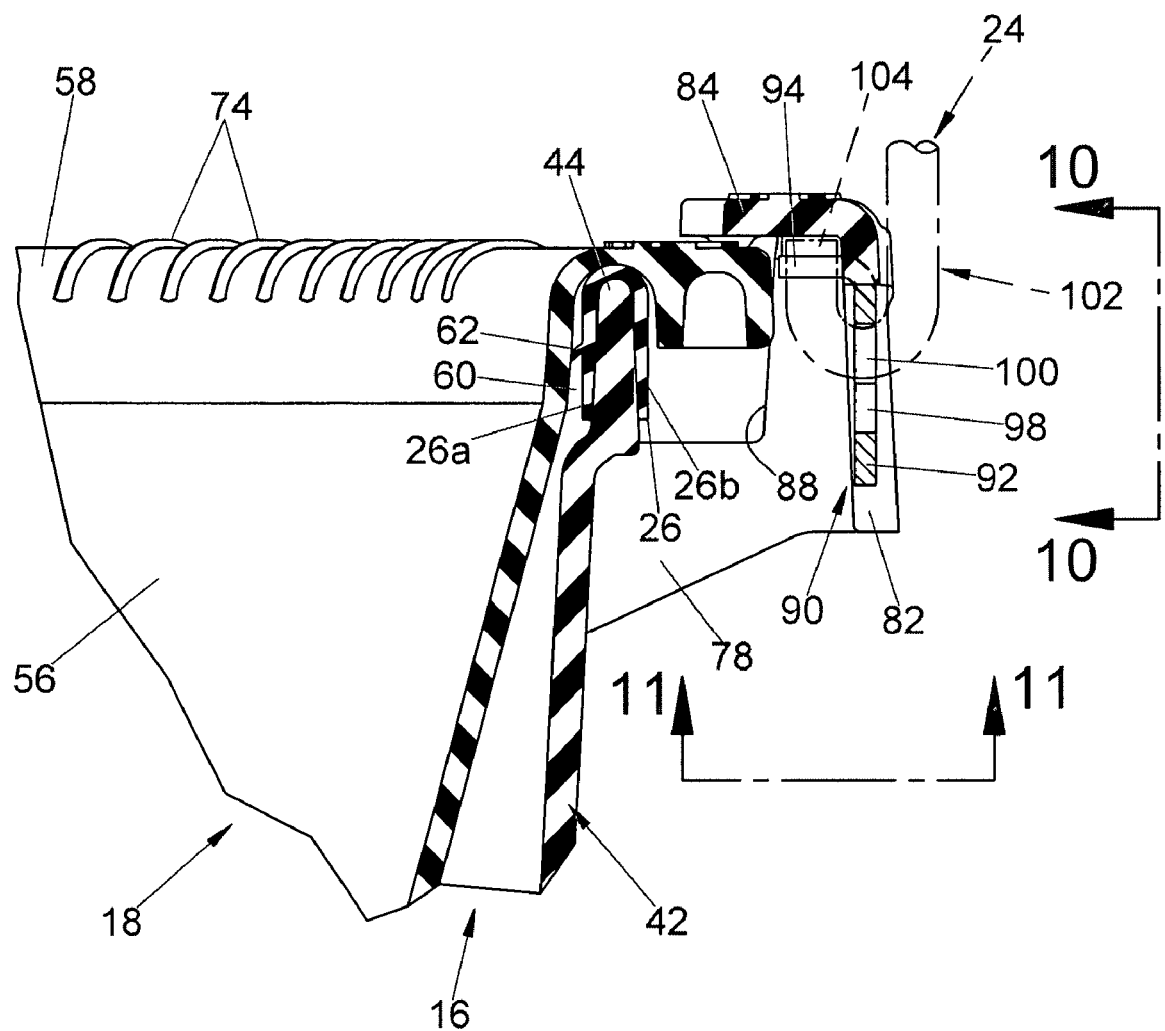
FIG. 9 is an enlarged sectional elevation view taken along line 9—9 in FIG. 5.
Figure 10:
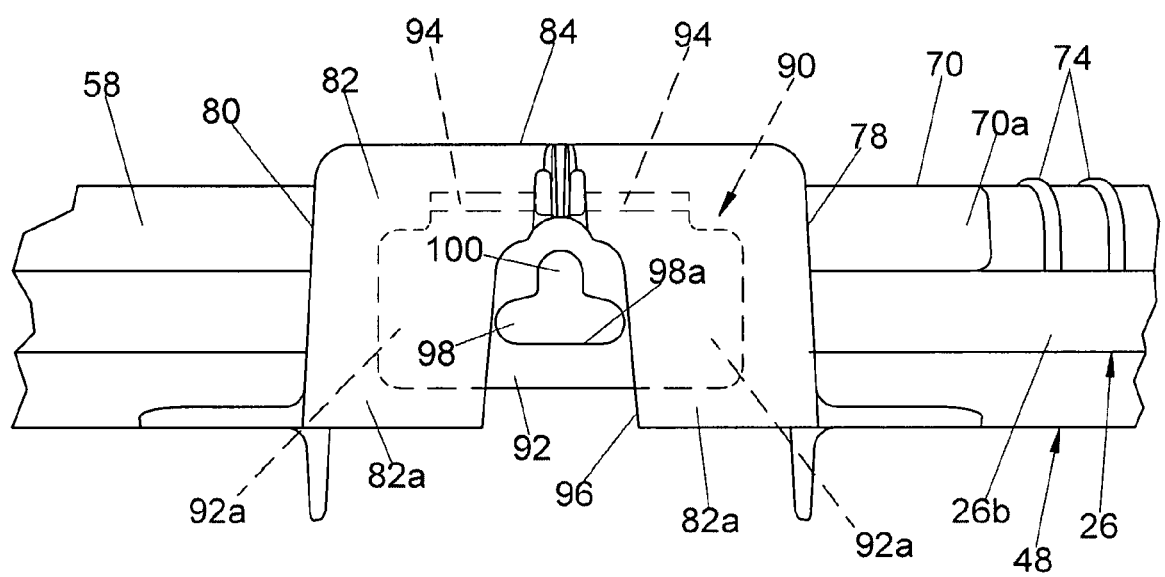
FIG. 10 is an enlarged side elevation view of the bail area of the container looking in the direction from right to left in FIG. 9.
Figure 11:
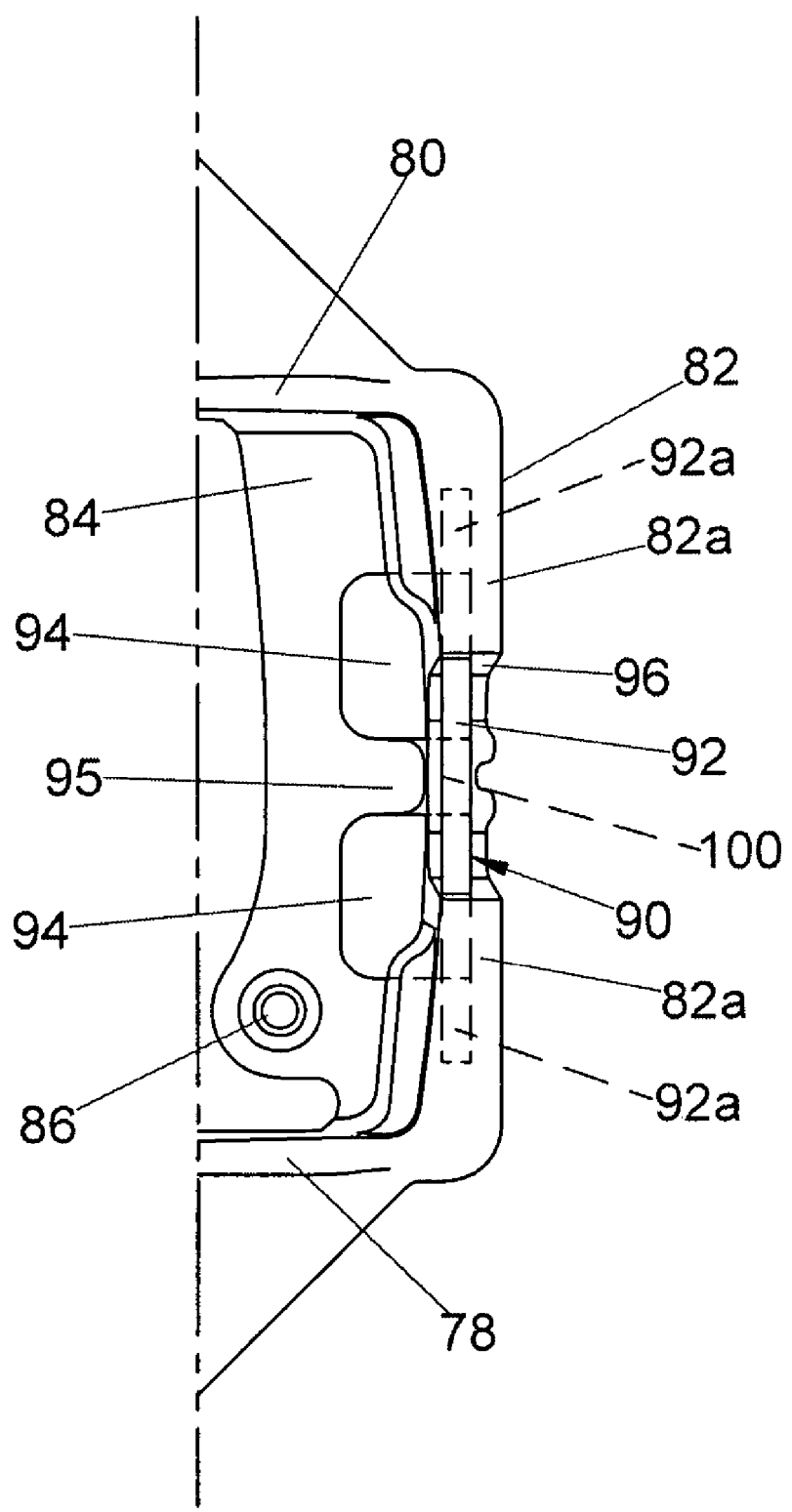
FIG. 11 is a view of the underside of the bail clip looking in the direction of line 11—11 in FIG. 9 with the pan component removed.
Figure 12:
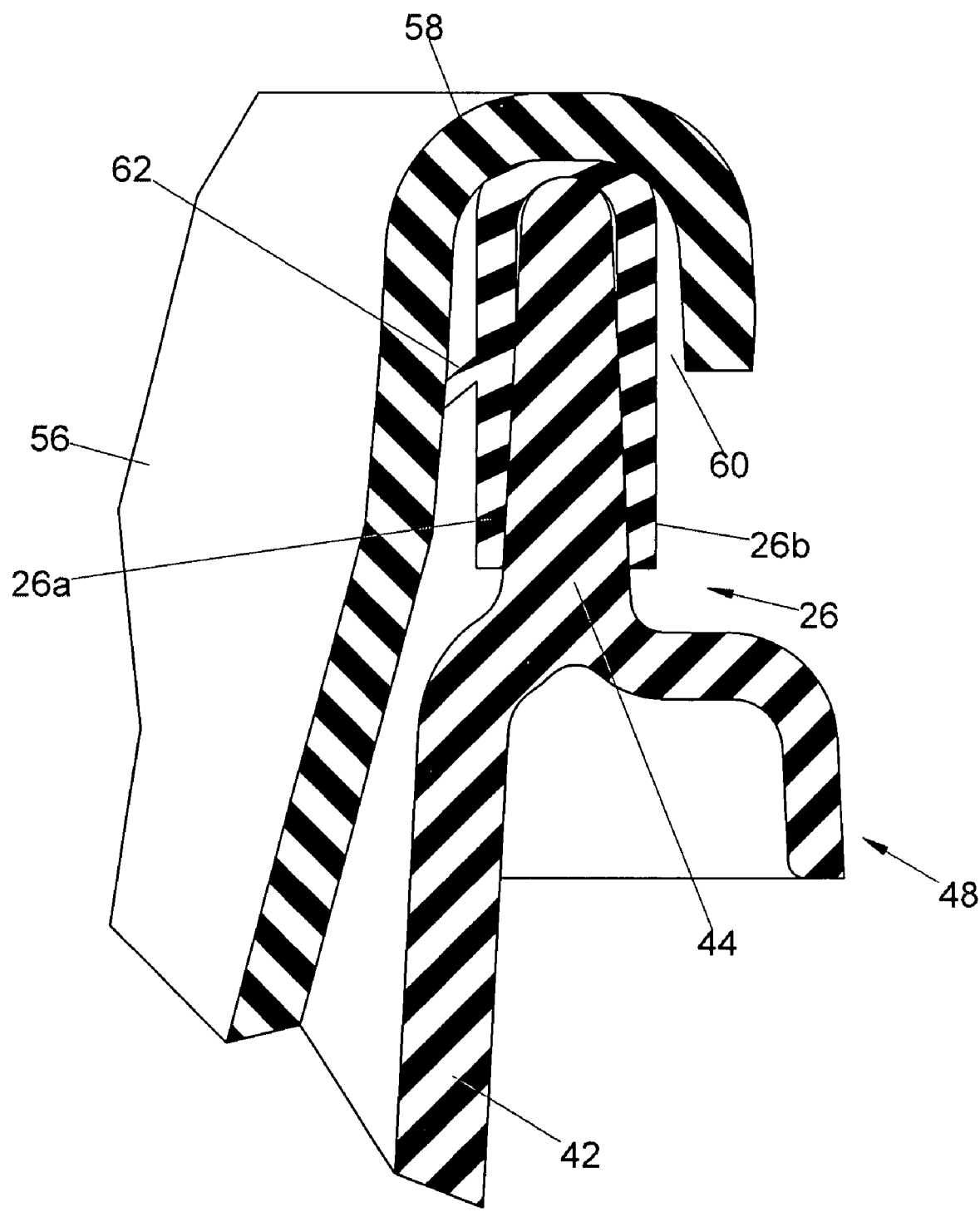
FIG. 12 is an enlarged cross-sectional elevation view through the assembled components of the container taken along line 12—12 in FIG. 5; and, FIG. 13 is an enlarged cross-sectional elevation view through the strainer and bulkhead fitting taken along line 13—13 in FIG. 4.

As shown in FIGS. 1, 2 5, and 6, pan 18, which is also preferably produced from a low density polyethylene, comprises a bottom wall 54 and a sidewall 56 extending thereabout and upwardly therefrom and terminating in a circumferentially continuous rim in the form of a skirt 58 which, as best seen in FIGS. 9 and 12, provides a downwardly open U-shaped recess 60 adapted to receive rim 44 of sidewall 42 of the bucket. Preferably, as mentioned above, a sealing ring 26 is interposed between the bucket and drip pan and, in the preferred embodiment, is of a suitable plastic material and has an inverted, U-shaped body portion providing inner and outer legs 26a and 26b, respectively, tightly received on rim 44 of the bucket sidewall. Accordingly, the sealing ring is interposed between rim 44 and recess 60 provided by skirt 58. Sealing ring 26 includes a circumferentially continuous sealing lip or flange 62 extending downwardly and inwardly from leg 26a for sealing engagement with sidewall 56 of the pan in the area of skirt 58 thereof so as to seal the bucket and pan against the leakage of oil across the interface therebetween should the oiler be tipped onto its side during use, transportation and/or storage. Bottom wall 54 of pan 18 is spaced above bottom wall 40 of bucket 16 and the oil in reservoir area R. Further, bottom wall 54 is provided with a plurality of radially extending fingers 64 which are slightly raised above drainage areas 66 of the bottom wall which are between the fingers and provided with openings 68 for the drainage of oil back into reservoir area R of the bucket when chips and oil fall into the pan during use of the oiler. Pan 18 is adapted to releasably interengage with bucket 16 through a twist-lock interengaging arrangement therebetween which is described in greater detail hereinafter and which includes a pair of diametrically opposed locking members 70 on pan 18 and extending radially outwardly of skirt 58, thereof. For the purpose set forth hereinafter, skirt 58 is provided with a pair of diametrically opposed stop members 72, which extend upwardly from the uppermost surface of the skirt and radially outwardly thereof, and circumferentially spaced apart groups of ribs 74 and 76, respectively adjacent a corresponding one of the locking components 70 and stop members 72 and extending upwardly relative to the outer surface of skirt 58.

As mentioned hereinabove, bucket 16 is provided with a pair of diametrically opposed bail plate mounting and pan interengaging components 46. As best seen in FIGS. 5, 6, 9, and 10, components 46 are integral with sidewall 42 of the bucket and each of the components comprises a pair of radially outwardly extending circumferentially spaced apart end walls 78 and 80, a substantially vertical radially outer upright wall 82 extending circumferentially between the end walls, and a locking member 84 between the end walls and extending radially inwardly from wall 82 toward but short of rim 44 of sidewall 42. Locking member 84 lies in a plane providing for the radially inner end thereof to overlie a locking member 70 on pan 18. Preferably, the underside of locking member 84 is provided with a downwardly extending bead or dimple 86 to slidably interengage with the upper surface of locking member 70. For the purpose set forth hereinafter, end wall 78 of each component 46 is provided with a window or opening 88 having a radial width at least equal to the radial outward extent of locking member 70 relative thereto.

As will be appreciated from FIGS. 1, 5, 6, and 9, when pan 18 is interengaged with bucket 16, locking members 70 extend through windows 88 of components 46 and underlie locking members 84 thereof. The pan is adapted to be disengaged for removal from the bucket by rotating the pan counterclockwise in FIGS. 1, 5 and 6 relative to the bucket to disengage locking members 70 on the pan from locking members 84 on the bucket. This can be achieved, for example, by grasping one of the components 46 with one hand and engaging rim 58 of the pan with the other hand and turning the pan relative to the bucket. Ribs 74 or 76, as well as stops 72 facilitate such displacement of the pan, especially if the latter and/or the user's hands are oily. Stops 72 limit the unlocking displacement of the pan by engaging components 46 and, if ribs 76 are used to displace the pan, space the user's fingers from components 46 when the stops engage thereagainst. Preferably, the circumferential lengths of locking members 70 is greater than the length necessary to lockingly interengage with locking members 84. More particularly, the lengths of locking members 70 is such that, when the pan is disengaged from the bucket, members 70 can be used, comfortably and with stability, as handles for lifting the pan from the bucket, such as for disposing of chips therein, cleaning, and/or maintenance of the container components, or the like. When the pan is replaced on the bucket, rim 58 is positioned over rim 44 of the bucket and sealing ring 26 thereon with ends 70b of locking members 70 adjacent windows 88 in walls 78 of components 46, and the pan is then displaced clockwise relative to the bucket for locking members 70 to move beneath locking members 84. Again, ribs 74 and 76 and stops 72 can be used to facilitate such displacement. Interengagement between members 70 and members 84 in the direction of engagement is limited by the engagement of ends 70b of locking members 70 with the closed end wall 80 of the corresponding component 46. Moreover, dimples 86 on locking members 84 engage against the top side of the corresponding locking member 70 so as to frictionally engage the components against unintentional displacement therebetween. While a pair of stops 72, a pair of closed end walls 80 and pairs of rib groups 74 and 76 are preferred, it will be appreciated that the stop functions can be achieved with one stop 72 and one end wall 80 and that the gripping function can be achieved with just one of the groups of ribs 74 or just one of the groups of ribs 76.

Figure 4:
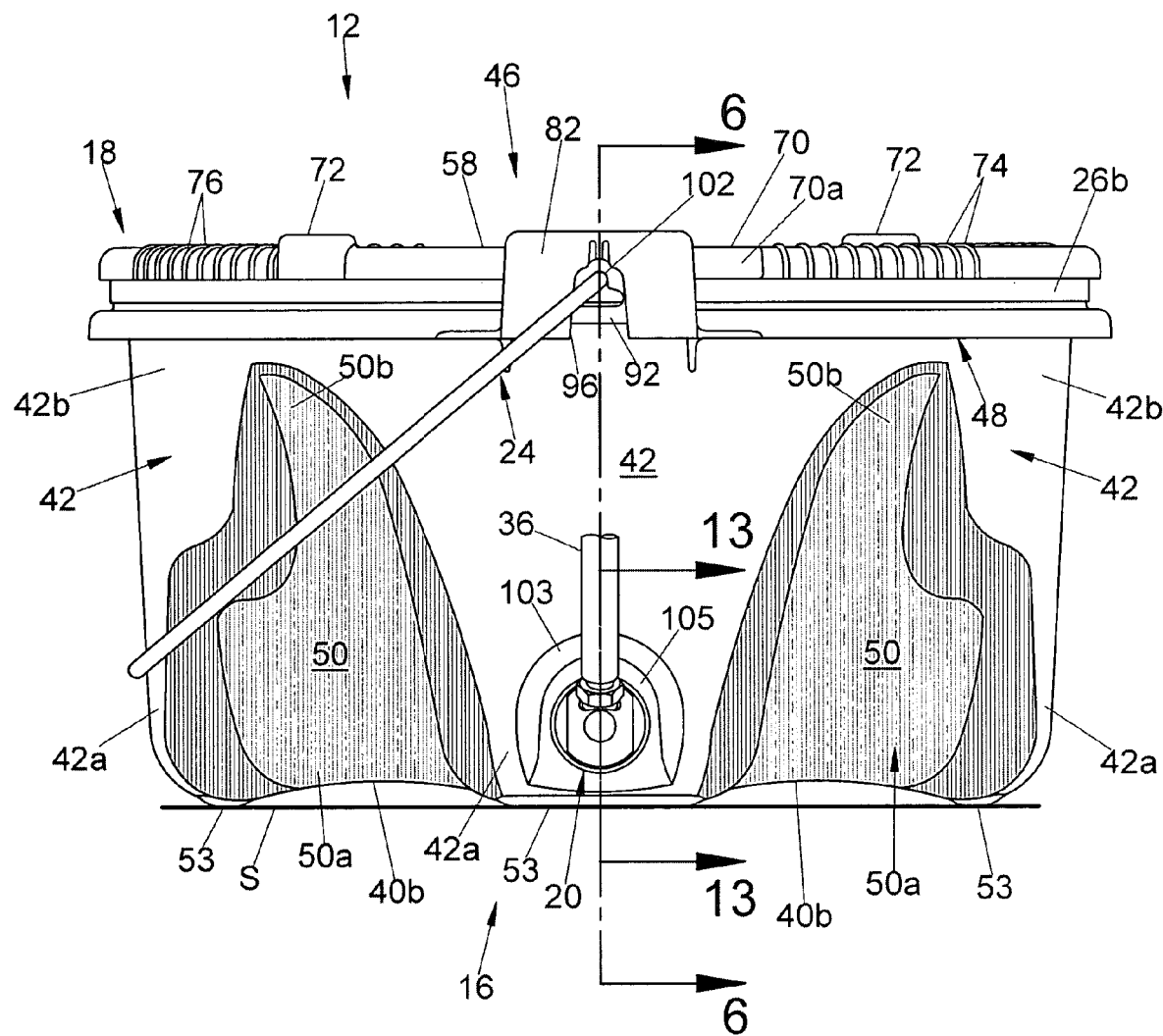
FIG. 4 is a front elevation view of the oil container.
Figure 5:
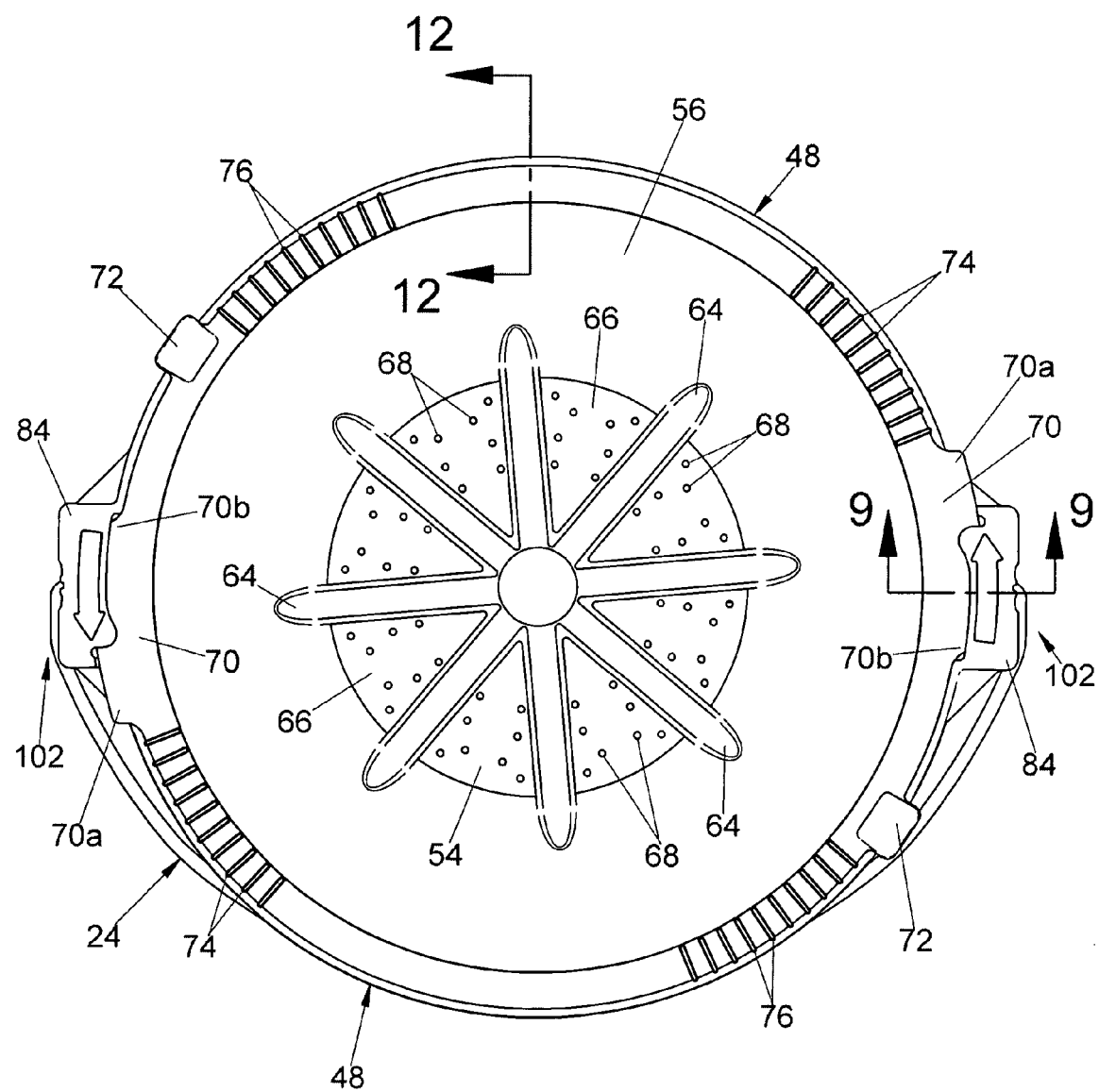
FIG. 5 is a plan view of the oil container.

The oiler is adapted to be lifted and carried by means of wire bail 24, mentioned above, which has its opposite ends pivotally interengaged with a bail plate member 90 having a vertical plate portion 92 the opposite ends 92a of which are embedded in wall 82 of the corresponding component 46. Plate member 90 further includes a pair of radially inwardly extending fingers 94 which are horizontally spaced apart to provide a slot 95 therebetween for the purpose set forth hereinafter. Wall 82 has a pair of circumferentially spaced apart leg portions 82a in which the opposite ends 92a of plate portion 92 are embedded and which provide a downwardly open U-shaped window 96 through which plate portion 92 is exposed. The exposed portion of the plate is provided with a horizontal slot 98 and a vertical slot 100 intersecting slot 98 intermediate the opposite ends thereof and having a vertical length measured from the upper end thereof to bottom surface 98a of slot 98. Preferably, for the purpose set forth hereinafter, the horizontal extent of slot 98 is greater than the vertical length of slot 100. As will be appreciated from bail end 102 shown in FIG. 2 of the drawing, each of the bail ends is U-shaped and includes an inner leg 104 extending toward bight portion 24a of bail 24 and having a length L. Length L is less than the horizontal length of slot 98 in the bail plate but greater than the vertical length of slot 100 in the bail plate. Further, leg 104 is spaced from the outer portion of the bail end a distance at least equal to the thickness of wall 82. Accordingly, the bail can be interconnected with bucket 16 only by supporting the bail in a horizontal plane and inserting legs 104 inwardly through the corresponding slot 98. The bail is then pivoted upwardly or downwardly for leg 104 to engage behind plate portion 92. The length L of leg 104 precludes the bail becoming disengaged from the bucket when the bail is in a vertical plane or is inclined downwardly as shown in FIG. 4, for example. When the bail is in a vertical plane, the upper ends of vertical slots 100, provide for the bights of ends 102 to engage thereagainst for lifting the container. When so engaged, the upper ends of legs 104 engage in slot 95 between fingers 94 of the corresponding bail plate to preclude pivoting of the container relative to the bail while the container is being carried. While it is preferred to use a metal bail plate to avoid wear which would occur using a metal bail and plastic bail support, it will be appreciated that the primary disadvantage of the latter would be to shorten the life of the bail support as a result of stress and wear.

Figure 6:
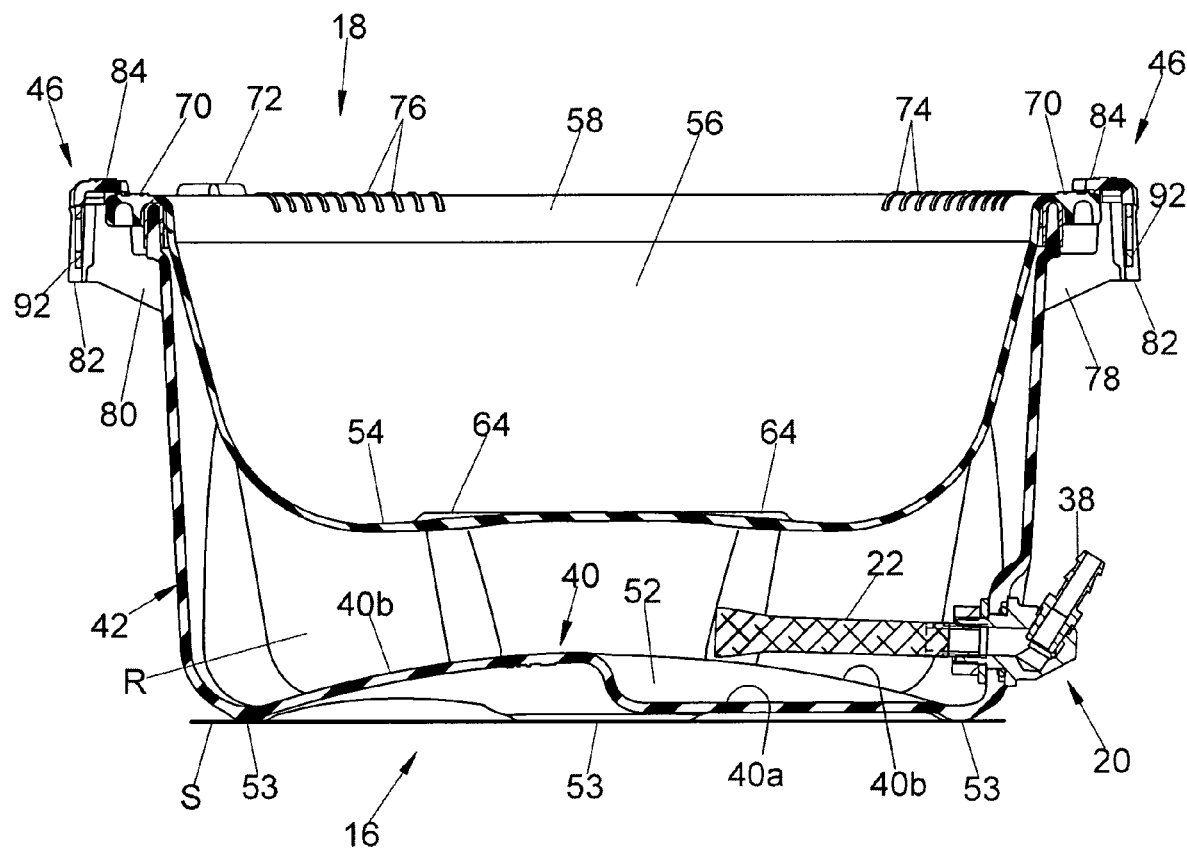
FIG. 6 is a cross-sectional elevation view of the container taken along line 6—6 in FIG. 4.
Figure 7:
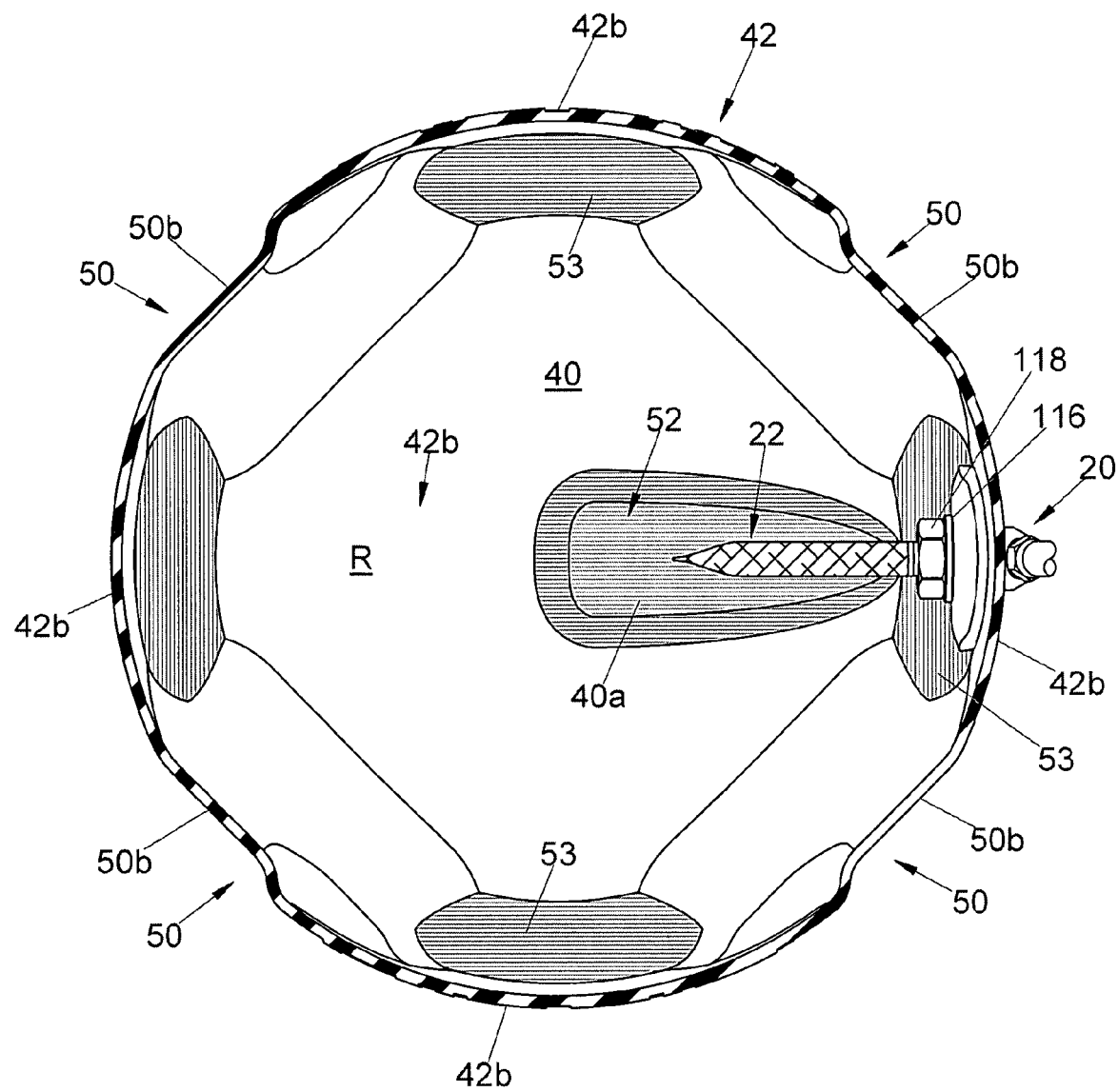
FIG. 7 is a plan view, in section, of the bucket component taken along line 7—7 in FIG. 3.
Figure 8:
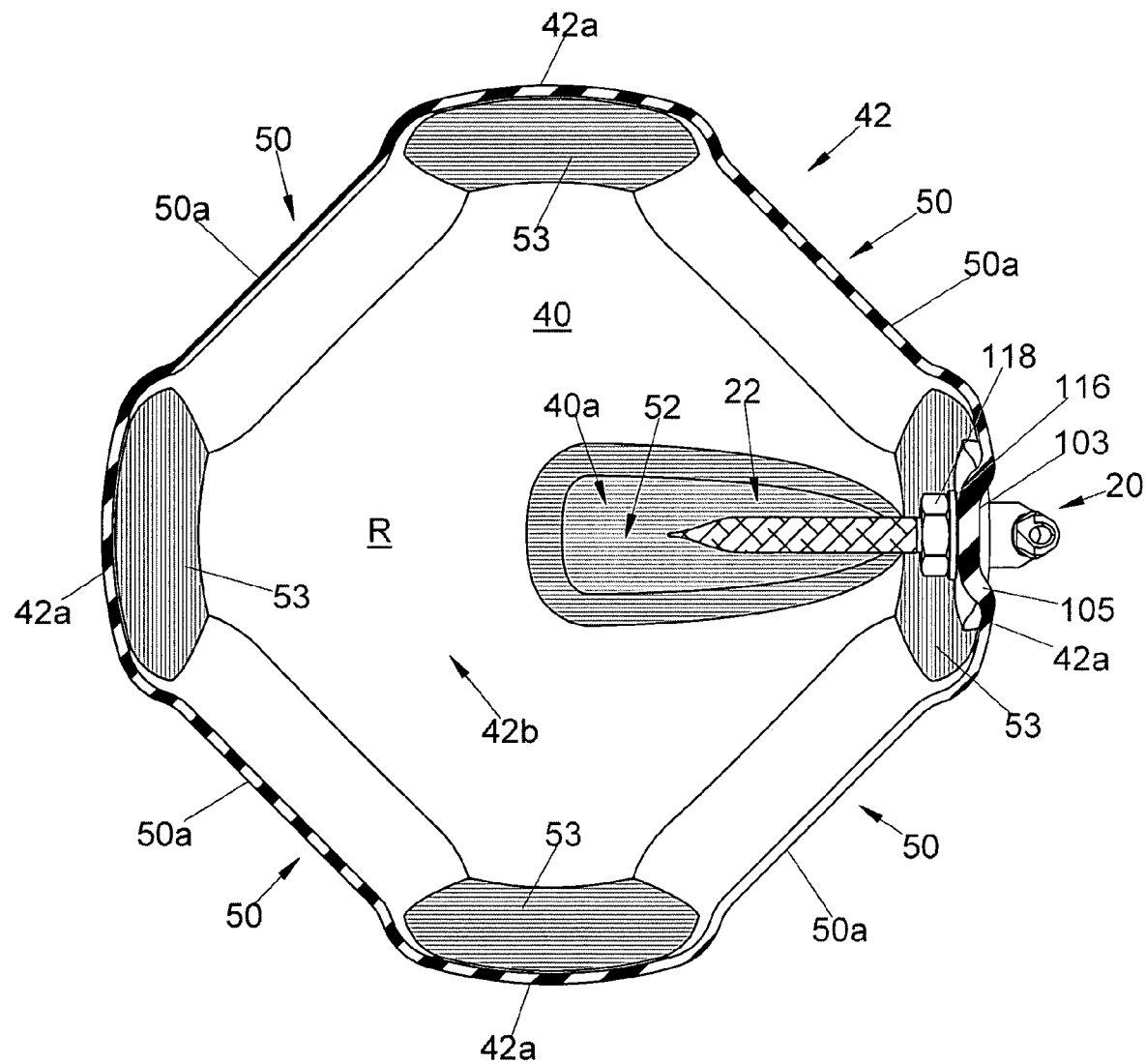
FIG. 8 is a plan view, in section, of the bucket component taken along line 8—8 in FIG. 3.
Figure 13:
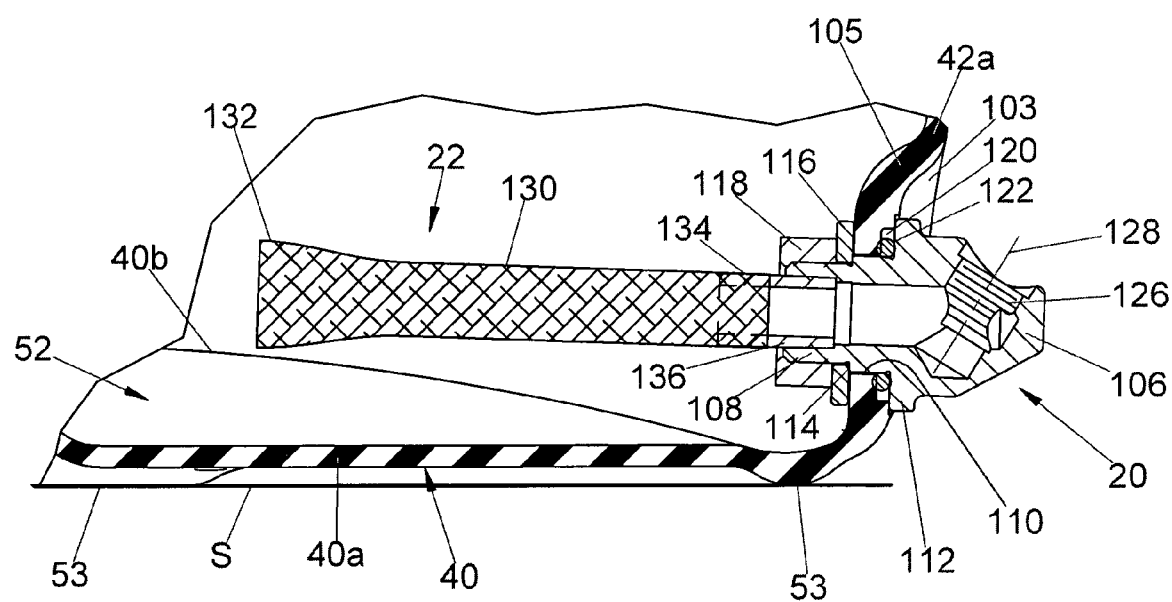

In accordance with another aspect of the invention, as best seen in FIGS. 2, 6 and 13, bulkhead fitting 20 by which pump hose 36 is connected in flow communication with reservoir area R of the bucket is provided with an improved structure and mounting arrangement which optimizes against leakage across the connection thereof with the bucket and reduces the stresses imposed on the hose during use of the oiler. More particularly with regard to these features, lower end 42a of bucket sidewall 42 between a pair of the recesses 50 is provided with a bulkhead mounting recess 103 which provides a flat or planar wall 105 on which the bulkhead fitting and strainer 22 are mounted. Fitting 20 includes a body portion 106 on the outer side of wall 105 and a sleeve portion 108 extending therefrom and through an opening 110 in wall 105 and terminating inwardly of the inner side thereof. Body portion 106 includes a radially outwardly extending peripheral flange 112 adapted to engage against the outer side of wall 105, and sleeve portion 108 includes an abutment shoulder 114 at the inner side of wall 105 against which a washer 116 is engaged. Wall 105 is axially captured between flange 112 and washer 116 by a mounting nut 118 threadedly interengaged with the innermost end of sleeve portion 108. Preferably, the relationship between flange 112, shoulder 114 and washer 116 provides for controlling the compression of wall 105 so as to reduce wear and stress thereon while providing for the bulkhead fitting to swivel about the axis of opening 110. Further in connection with the swivel relationship, the outer side of wall 105 is provided with a recess 120 extending about the fitting axially inwardly adjacent flange 112 and receiving a resilient O-ring 122 which seals against the leakage of oil from the reservoir across the fitting. Sleeve portion 108 provides fitting 20 with an inlet passageway 124 for oil in reservoir area R of bucket 16, and body portion 106 is provided with an internally threaded bore 126 which provides an outlet passageway for delivering the oil to hose 36 and pump 14. Hose fitting 38 is externally threaded for threaded interengagement with bore 126, and the latter has an axis 128 which is inclined upwardly and outwardly relative to the bucket and at an acute angle which, preferably, is 45° to horizontal or vertical. This advantageously provides for a user of the oiler to move the container from one location to another along an underlying surface by pulling on the hose while imposing minimal side forces on the hose and bending thereof at the bulkhead fitting. This prolongs the life of the hose by avoiding or delaying fracture of the hose adjacent the fitting from such bending and side forces. Strainer 22 comprises a tube 130 of wire mesh which is crimped at end 132 thereof to close the latter end and which is provided at the opposite end 134 thereof with a metal mounting sleeve 136 over which end 134 is tightly received. The innermost end of sleeve portion 108 is internally threaded and mounting sleeve 136 is externally threaded for interengagement therewith to removably mount the strainer on the bulkhead fitting.

While considerable emphasis has been placed herein on the structure and structural interrelationship between the component parts of a preferred embodiment of an oiler container, it will be appreciated that other embodiments can be devised and that many changes can be made in the preferred embodiment without departing from the principals of the invention. In this respect, for example, while it is preferred to make the bucket and pan components from plastic material, it will be appreciated that one or the other or both could be of metal, especially with regard to providing the twist lock interengaging relationship therebetween. Further, other components or arrangements can be devised and used to provide the hard stop functions of the stop members 72 on the pan and closed walls 80 on the bucket. Still further, the metal bail plate can be attached to the plastic support component other than by being embedded therein and, for example, could be riveted or clipped to the support therefor. These and other changes as well as other embodiments will be obvious or suggested from the description of the preferred embodiment herein. Accordingly, it is to be distinctly understood that the foregoing descriptive matter is to be interpreted merely as illustrative of the invention and not as a limitation.

The invention claimed is:

1. A container for an oil dispenser comprising, a bucket for oil to be dispensed, said bucket having a bottom, a sidewall and an annular upper end, a pan in said bucket and having an apertured bottom spaced above the bottom of said bucket, a sidewall inwardly of the sidewall of said bucket and an upper end overlying and slidable circumferentially relative to the upper end of said bucket, and the bucket and pan including means interengaging during relative sliding displacement therebetween to releasably interengage the bucket and pan against separation.

2. A container according to claim 1, wherein said bucket includes an outlet for the flow of oil therefrom, said outlet extending upwardly and outwardly at an acute angle to horizontal.

3. A container according to claim 1, and an annular seal interposed between said upper end of said bucket and said upper end of said pan.

4. A container according to claim 1, wherein said bucket is plastic and includes diametrically opposed bail supports adjacent the upper end thereof, each said bail support including a wall member of plastic material on said bucket and a bail plate of metal on said wall member, and a bail for lifting the bucket and having opposite ends each interengaged with the bail plate of a different one of said bail supports.

5. A container for an oil dispenser comprising, a bucket for oil to be dispensed, said bucket having a bottom, a sidewall and an annular upper end, a pan in said bucket and having an apertured bottom spaced above the bottom of said bucket, a sidewall inwardly of the sidewall of said bucket and an upper end overlying and slidable circumferentially relative to the upper end of said bucket, the bucket and pan including means interengaging during relative sliding displacement therebetween to releasably interengage the bucket and pan against separation, said bucket being plastic and including diametrically opposed bail supports adjacent the upper end thereof, each said bail support including a wall member of plastic material on said bucket and a bail plate of metal on said wall member, and a bail for lifting the bucket and having opposite ends each interengaged with the bail plate of a different one of said bail supports, said bail plate having intersecting vertical and horizontal slots therethrough, the horizontal slot having a length greater than the length of the vertical slot, and each end of said bail being U-shaped and terminating in a leg having a length shorter than the length of said horizontal slot and longer than the length of said vertical slot.

6. A container according to claim 5, wherein said bail plate has outer and inner sides and a pair of fingers spaced above said vertical slot and extending inwardly of said inner side, said pair of fingers being spaced apart horizontally to provide a space therebetween, and said leg of said bail end extending into said space to preclude pivotal displacement between said bucket and bail when said bail supports the bucket.

7. A container according to claim 6, wherein said bail plate is embedded in said wall member.

8. A container according to claim 1, wherein said interengaging means includes a pair of diametrically opposed first locking members on said pan and a pair of diametrically opposed second locking members on said bucket.

9. A container according to claim 8, further including a bail support adjacent each of said second locking members, and a bail for lifting said bucket, said bail having opposite ends each interengaged with a different one of the bail supports.

10. A container for an oil dispenser comprising, a bucket for oil to be dispensed, said bucket having a bottom, a sidewall and an annular upper end, a pan in said bucket and having an apertured bottom spaced above the bottom of said bucket, a sidewall inwardly of the sidewall of said bucket and an upper end overlying and slidable circumferentially relative to the upper end of said bucket, the bucket and pan including means interengaging during relative sliding displacement therebetween to releasably interengage the bucket and pan against separation, said interengaging means including a pair of diametrically opposed first locking members on said pan and a pair of diametrically opposed second locking members on said bucket, a bail support adjacent each of said second locking members, a bail for lifting said bucket, said bail having opposite ends each interengaged with a different one of the bail supports, and said bail support having intersecting vertical and horizontal slots therethrough, the horizontal slot having a length greater than the length of the vertical slot, and each end of said bail being U-shaped and terminating in a leg having a length shorter than the length of said horizontal slot and longer than the length of said vertical slot.

11. A container according to claim 10, wherein each said bail support has outer and inner sides and a pair of fingers spaced above said vertical slot and extending inwardly of said inner side, said pair of fingers being spaced apart horizontally to provide a space therebetween, said vertical slot having an upper end engaging with the bight of the corresponding bail end for said bail to support said bucket, and said leg of said bail end extending into said space to preclude pivotal displacement between said bucket and bail when said bail supports the bucket.

12. A container according to claim 1, wherein said bottom of said bucket has a recess extending radially toward said sidewall of said bucket, a bulkhead fitting extending through said sidewall of said bucket and having inner and outer ends relative to said sidewall, said inner end being at the radially outer end of said recess, said fitting having a passageway therethrough for the flow of oil from said bucket, said bottom of said bucket having a raised portion extending circumferentially about said recess therein, and said sidewall of said bucket including a plurality of inwardly extending recesses circumferentially spaced apart thereabout.

13. A container according to claim 12, wherein said passageway has an outlet end in said outer end of said fitting and extending at an acute angle to horizontal.

14. A container according to claim 13, and a strainer on said inner end of said fitting and extending radially inwardly of said recess in the bottom of the bucket.

15. A container according to claim 1, wherein said interengaging means includes a plurality of first locking members extending outwardly of said upper end of said pan and a plurality of second locking members extending inwardly of said upper end of said bucket, a portion of a second locking member overlying at least a portion of a first locking member when interengaged therewith.

16. A container according to claim 15, wherein each of said first and second locking members has circumferentially opposite ends, one of the ends of at least one of the second locking members including a stop for limiting sliding displacement of a first locking member relative thereto in the direction of interengagement.

17. A container according to claim 15, wherein said interengaging means further includes an upright wall for each second locking member spaced outwardly of said upper end of said bucket, and said second locking member extending radially inwardly from said upright wall.

18. A container according to claim 17, wherein the upright walls are diametrically opposed, a bail plate on each upright wall, and a bail for lifting said bucket, said bail having opposite ends each interengaged with a different one of the bail plates.

19. A container for an oil dispenser comprising, a bucket for oil to be dispensed, said bucket having a bottom, a sidewall and an annular upper end, a pan in said bucket and having an apertured bottom spaced above the bottom of said bucket, a sidewall inwardly of the sidewall of said bucket and an upper end overlying and slidable circumferentially relative to the upper end of said bucket, the bucket and pan including means interengaging during relative sliding displacement therebetween to releasably interengage the bucket and pan against separation, said interengaging means including a plurality of first locking members extending outwardly of said upper end of said bucket, a portion of a second locking member overlying at least a portion of a first locking member when interengaged therewith, said interengaging means further including an upright wall for each second locking member spaced outwardly of said upper end of said bucket, said second locking member extending radially inwardly from said upright wall, said upright walls being diametrically opposed, a bail plate on each upright wall, a bail for lifting said bucket, said bail having opposite ends each interengaged with a different one of the bail plates, and said bail plate having intersecting vertical and horizontal slots therethrough, the horizontal slot having a length greater than the length of the vertical slot, and each end of said bail being U-shaped and terminating in a leg having a length shorter than the length of said horizontal slot and longer than the length of said vertical slot.

20. A container according to claim 19, wherein said bail plate has outer and inner sides and a pair of fingers spaced above said vertical slot and extending inwardly of said inner side, said pair of fingers being spaced apart horizontally to provide a space therebetween, said vertical slot having an upper end engaging with the bight of the corresponding bail end for said bail to support said bucket, and said leg of said bail end extending into said space to preclude pivotal displacement between said bucket and bail when said bail supports the bucket.

21. A container according to claim 20, wherein each of said first and second locking members has circumferentially opposite ends, one of the ends of at least one of the second locking members including a stop for limiting sliding displacement of a first locking member relative thereto in the direction of interengagement.

22. A container according to claim 21, wherein said upper end of said pan includes at least one stop for limiting sliding displacement of a first locking member relative to a second locking member in the direction of disengagement therebetween.

23. A container according to claim 22, and an annular seal interposed between said upper end of said bucket and said upper end of said pan, said seal including an annular sealing lip engaging the sidewall of the pan.

24. A container according to claim 23, wherein the undersides of said second locking members include a dimple engaging with the underlying first locking member during sliding engagement therebetween.

25. A container for an oil dispenser comprising, a bucket of plastic material having a bottom wall, a sidewall extending about said bottom wall and upwardly therefrom, and an annular rim at the upper end of said sidewall, a pan of plastic material in said bucket and having an apertured bottom wall spaced above said bottom of said bucket, a sidewall inwardly of said sidewall of said bucket and an annular rim at the upper end of said sidewall of said pan extending radially outwardly thereof and overlying said annular rim of the bucket, said pan including first locking members extending radially outwardly from the rim thereof at locations spaced apart circumferentially thereabout, said bucket including second locking members circumferentially spaced apart about the rim thereof and extending radially inwardly of the first locking members, and said pan being circumferentially displaceable relative to said bucket to selectively position said first locking members in engaging and disengaging relationship with said second locking members to respectively interengage said bucket and pan against separation and release said pan for separation from said bucket.

26. A container according to claim 25, wherein said sidewall of said bucket includes a plurality of inwardly extending recesses circumferentially spaced apart thereabout and having lower ends adjacent the bottom wall of the bucket and upper ends adjacent the annular rim thereof.

27. A container according to claim 26, wherein said lower ends are circumferentially wider than said upper ends and said plurality of recesses includes four recesses in diametrically opposed pairs.

28. A container according to claim 25, wherein said bottom wall of said bucket includes a plurality of feet circumferentially spaced apart thereabout for supporting the bucket on an underlying surface.

29. A container according to claim 28, wherein the bottom wall of the bucket is curved arcuately upwardly between circumferentially adjacent ones of said feet and said plurality of feet includes four feet in diametrically opposed pairs.

30. A container according to claim 29, wherein the bottom wall of the bucket includes an arcuate portion curved upwardly in the direction between diametrically opposite ones of said feet, said bottom wall of the bucket further including a radially extending recess in said arcuate portion having an outer end adjacent one of said feet, and a bulkhead fitting mounted on the sidewall of the bucket and having an inner end adjacent the outer end of said radially extending recess and an outer end outside of the sidewall of the bucket, and said fitting having a passageway therethrough for the flow of oil from the bucket.

31. A container according to claim 30, wherein said passage has an outlet end in said outer end of said fitting and extending upwardly at an acute angle to horizontal.

32. A container according to claim 31, wherein said acute angle is 45°.

33. A container according to claim 25, wherein said bucket includes a pair of diametrically opposed upright walls each spaced radially outwardly of and connected to the sidewall of the bucket adjacent the rim thereof, a metal bail plate on each upright wall, and a bail for lifting the bucket and having opposite ends each interengaged with a different one of the bail plates.

34. A container for an oil dispenser comprising, a bucket of plastic material having a bottom wall, a sidewall extending about said bottom wall and upwardly therefrom, and an annular rim at the upper end of said sidewall, a pan of plastic material in said bucket and having an apertured bottom wall spaced above said bottom of said bucket, a sidewall inwardly of said sidewall of said bucket and an annular rim at the upper end of said sidewall of said pan extending radially outwardly thereof and overlying said annular rim of the bucket, said pan including first locking members extending radially outwardly from the rim thereof at locations spaced apart circumferentially thereabout, said bucket including second locking members circumferentially spaced apart about the rim thereof and extending radially inwardly of the first locking members, said pan being circumferentially displaceable relative to said bucket to selectively position said first locking members in engaging and disengaging relationship with said second locking members to respectively interengage said bucket and pan against separation and release said pan for separation from said bucket, said bucket including a pair of diametrically opposed upright walls each spaced radially outwardly of and connected to the sidewall of the bucket adjacent the rim thereof, a metal bail plate on each upright wall, and a bail for lifting the bucket and having opposite ends each interengaged with a different one of the bail plates, said bail plate having intersecting vertical and horizontal slots therethrough, the horizontal slot having a length greater than the length of the vertical slot, and each end of said bail being U-shaped and terminating in a leg having a length shorter than the length of said horizontal slot and longer than the length of said vertical slot.

35. A container according to claim 34, wherein said second locking members include a pair of second locking members each extending inwardly from a different one of said upright walls.

36. A container according to claim 35, wherein each bail plate is embedded in the corresponding upright wall and wherein said bail plate has outer and inner sides and a pair of fingers spaced above said vertical slot and extending inwardly transverse to said inner side, said pair of fingers being spaced apart horizontally to provide a space therebetween, said vertical slot having an upper end engaging with the bight of the corresponding bail end for said bail to support said bucket, and said leg of said bail end extending into said space to preclude pivotal displacement between said bucket and bail when said bail supports the bucket.

37. A container according to claim 25, wherein said first locking members are a pair of diametrically opposed locking members on said rim of said pan, said bucket including a pair of diametrically opposed locking member supports each including circumferentially spaced apart end walls extending radially outwardly from the sidewall of the bucket and having upper ends at the rim of the bucket, each second locking member extending between the end walls of a different one of said locking member supports and radially inwardly to overlie a corresponding one of said first locking members when the first and second locking members are in engaging relationship.

38. A container according to claim 37, wherein a corresponding one of the end walls of each locking member support includes an opening for circumferentially receiving said corresponding one of said first locking members beneath the second locking member of the corresponding locking member support.

39. A container according to claim 38, wherein at least one of the other end walls of one of said locking member supports is positioned to be engaged by a first locking member to limit circumferential displacement of the pan relative to the bucket in the direction of engagement therebetween.

40. A container according to claim 37, wherein said rim of said pan includes a stop member for engaging one of said locking member supports to limit circumferential displacement of the pan relative to the bucket in the direction of disengagement therebetween.

41. A container according to claim 40, wherein said rim of said pan includes at least one group of circumferentially adjacent ribs projecting outwardly of the rim.

42. A container according to claim 41, wherein said at least one group includes four groups in diametrically opposed pairs of groups and said at least one group of ribs extends from said stop member in the direction opposite said direction of disengagement.

43. A container according to claim 42, wherein a corresponding one of the end walls of each locking member support includes an opening for circumferentially receiving said corresponding one of said first locking members beneath the second locking member of the corresponding locking member support, and at least one of the other end walls of one of said locking member supports being positioned to be engaged by a first locking component to limit circumferential displacement of the pan relative to the bucket in the direction of engagement therebetween.

44. A container according to claim 25, wherein said sidewall of said bucket has a bulkhead mounting recess adjacent the bottom wall thereof, said mounting recess including an apertured planar wall having radially inner and outer sides, a bulkhead fitting extending through the aperture in the planar wall and having a shoulder engaging against said outer side, said planar wall having an annular recess underlying said shoulder, and a resilient sealing element in said annular recess and compressively engaged between said shoulder and said recess.

45. A container according to claim 44, wherein said shoulder is a first shoulder and said fitting has an abutment shoulder adjacent the inner side of said planar wall, a washer engaging said abutment shoulder and said inner side of said planar wall, and a fastener engaging against said washer to capture said planar wall between said washer and said first shoulder, said first shoulder and said abutment shoulder being spaced apart to limit compression of said planar wall.

46. A container according to claim 45, wherein said bulkhead filling has inner and outer ends and a passageway therethrough, said passageway having an outlet end at said outer end of said filling extending at an acute angle to horizontal, and a strainer on said inner end of said fitting.

47. A container according to claim 25, and a sealing ring interposed between said rim of said bucket and said rim of said pan and including an annular sealing flange engaging the sidewall of said pan.

48. A container according to claim 47, wherein said sealing ring is mounted on the rim of said bucket and has an inverted U-shaped body portion providing a downwardly open recess receiving said rim of said bucket and inner and outer legs engaging the rim of the bucket, said annular sealing flange extending radially inwardly from said inner leg and sealingly engaging the sidewall of said pan.

49. A container for an oil dispenser comprising, a bucket of plastic material having a bottom wall, a sidewall extending about said bottom wall and upwardly therefrom, and an annular rim at the upper end of said sidewall, a pan of plastic material in said bucket and having an apertured bottom wall spaced above said bottom wall of said bucket, a sidewall inwardly of said sidewall of said bucket and an annular rim at the upper end of said sidewall of said pan extending radially outwardly thereof and overlying said annular rim of the bucket, a pair of diametrically opposed first locking members on said rim of said pan, said bucket including a pair of diametrically opposed locking member supports each including circumferentially spaced apart end walls extending radially outwardly from the sidewall of the bucket and having upper ends at the rim of the bucket, a pair of second locking members each extending between the end walls of a different one of said locking member supports and radially inwardly thereof, said pan being circumferentially displaceable relative to said bucket to selectively position said first locking members in engaging and disengaging relationship with said second locking members to respectively interengage said bucket and pan against separation and release said pan for separation from said bucket, and said second locking members extending radially inwardly to overlie a corresponding one of said first locking members when the first and second locking members are in engaging relationship.

50. A container according to claim 49, wherein said bucket includes an upright wall at the radially outer ends of the end walls of each locking member support, a metal bail plate embedded in each upright wall, each bail plate having intersecting vertical and horizontal slots therethrough, the horizontal slots being longer than the vertical slots, a bail having opposite ends each interengaged with a different one of the bail plates, each end of said bail being U-shaped and terminating in a leg having a length shorter than the length of the horizontal slot and longer than the length of the vertical slot.

51. A container according to claim 49, wherein said sidewall of said bucket includes diametrically opposed pairs of inwardly extending recesses circumferentially spaced apart thereabout and having lower ends adjacent the bottom wall of the bucket and upper ends adjacent the annular rim thereof, said lower ends being circumferentially wider than said upper ends, said bottom wall of said bucket including diametrically opposed pairs of feet for supporting the bucket on an underlying surface, said bottom wall being curved arcuately upwardly between circumferentially adjacent ones of said feet and including an arcuate portion curved upwardly in the direction between diametrically opposite ones of said feet.

52. A container according to claim 51, wherein the bottom wall of said bucket further includes a radially extending recess in said arcuate portion having an outer end adjacent one of said feet, and a bulkhead fitting mounted on the sidewall of the bucket and having an inner end adjacent the outer end of the recess and an outer end outside of the sidewall of the bucket, said fitting having a passageway therethrough for the flow of oil from the bucket, and said passageway having an outlet end in said outer end of said fitting extending upwardly at a 45° angle to horizontal.

53. A container according to claim 52, wherein said sidewall of said bucket has a bulkhead mounting recess adjacent the bottom wall thereof, said mounting recess including an apertured planar wall having radially inner and outer sides, said bulkhead fitting extending through the aperture in the planar wall and having a first shoulder engaging against said outer side, said planar wall having an annular recess underlying said first shoulder, and a resilient sealing element in said annular recess and compressively engaged between said shoulder and said recess, said fitting having an abutment shoulder adjacent the inner side of said planar wall, a washer engaging said abutment shoulder and said inner side of said planar wall, and a fastener engaging against said washer to capture said planar wall between said washer and said first shoulder, said first shoulder and said abutment shoulder being spaced apart to limit compression of said planar wall.

54. A container according to claim 49, wherein a corresponding one of the end walls of each locking member support includes an opening for circumferentially receiving said corresponding one of said first locking members beneath the second locking member of the corresponding locking member support, at least one of the other end walls of one of said locking member supports being positioned to be engaged by a first locking component to limit circumferential displacement of the pan relative to the bucket in the direction of engagement therebetween, and said rim of said pan including a stop member for engaging one of said locking member supports to limit circumferential displacement of the pan relative to the bucket in the direction of disengagement therebetween.

55. A container according to claim 54, wherein said rim of said pan includes four groups of circumferentially adjacent ribs in diametrically opposed pairs, and at least one of said groups of ribs extending from said stop member in the direction opposite said direction of disengagement.

56. A container according to claim 49, and a sealing ring interposed between the rim of the bucket and the rim of the pan and including an inverted U-shaped body portion providing a downwardly open recess receiving said rim of said bucket and inner and outer legs engaging the rim of the bucket, and an annular sealing flange extending radially inwardly from said inner leg and sealingly engaging the sidewall of the pan.

57. In a container for an oil dispenser comprising, a bucket for oil to be dispensed, said bucket having a bottom, a side wall and an annular upper end, a pan in said bucket and having an apertured bottom spaced above the bottom of said bucket, a sidewall inwardly of the sidewall of said bucket and an upper end overlying the upper end of said bucket, and a bulkhead fitting on the sidewall of the bucket adjacent the bottom thereof, the improvement comprising: said fitting having an inlet and an outlet at an acute angle to said inlet, and said outlet extending outwardly and upwardly of said sidewall of the bucket at an acute angle to horizontal.

58. The improvement according to claim 57, wherein said acute angle to horizontal is 45°.

59. The improvement according to claim 57, wherein said sidewall of said bucket has a bulkhead mounting recess adjacent the bottom wall thereof, said mounting recess including an apertured planar wall having radially inner and outer sides, said bulkhead fitting extending through the aperture in the planar wall and having a first shoulder engaging against said outer side, said planar wall having an annular recess underlying said first shoulder, and a resilient sealing element in said annular recess and compressively engaged between said shoulder and said recess.

60. The improvement according to claim 59, wherein said fitting has an abutment shoulder adjacent the inner side of said planar wall, a washer engaging said abutment shoulder and said inner side of said planar wall, and a fastener engaging against said washer to capture said planar wall between said washer and said first shoulder.

61. The improvement according to claim 60, wherein said first shoulder and said abutment shoulder are spaced apart to limit compression of said planar wall.

62. The improvement according to claim 61, wherein said acute angle to horizontal is 45°.

\* \* \* \* \*